United States Patent [19]
Grosseau

[11] 3,876,194
[45] Apr. 8, 1975

[54] FLEXIBLE FASTENING DEVICE FOR AUTOMOTIVE SEAT SUSPENSION ELEMENTS

[75] Inventor: Albert Grosseau, Paris, France

[73] Assignee: Societe Anonyme Automobile Citroen, Paris, France

[22] Filed: Aug. 29, 1973

[21] Appl. No.: 392,467

[30] Foreign Application Priority Data
Sept. 15, 1972 France................................ 72.32773

[52] U.S. Cl.................. 267/86; 267/102; 267/103; 267/110
[51] Int. Cl............................................... F16f 3/02
[58] Field of Search........ 267/86, 87, 102, 103, 104, 267/105, 107, 110, 111, 112

[56] References Cited
FOREIGN PATENTS OR APPLICATIONS
668,928   8/1963   Canada................................. 267/8

Primary Examiner—James B. Marbert
Attorney, Agent, or Firm—Wenderoth, Lind & Ponack

[57] ABSTRACT

This automotive accessory is intended for flexibly fastening elastic suspension elements of seats consisting of loop springs, and the ends of the springs are stapled to a flexible rod adapted to undergo a flexible deformation by flexion and disposed substantially perpendicularly to the springs, the rod ends being slidably engaged in supporting bearings rigidly secured to the peripheral frame of the seat.

5 Claims, 5 Drawing Figures 3,876,194

FLEXIBLE FASTENING DEVICE FOR AUTOMOTIVE SEAT SUSPENSION ELEMENTS

BACKGROUND OF THE INVENTION

The present invention relates in general to accessories for motor vehicles, notably for the seats of such vehicles, ans more particularly to devices for the flexible fastening of elastic suspension elements of such seats, wherein springs of the so-called "loop" or meander-forming type, are used.

It is a primary object of this invention to impart to the means, usually of rigid nature, provided for fastening the suspension elements a limited liberty of movement capable of generating a flexibility under load which modifies the flexibility characteristics and improved the comfort of the seat in general.

A known device comprises such loop-type springs constituting the "spring mattress" of the seat squab wherein the spring ends are fastened or connected to the squab frame by means of hinges. Though this arrangement permits a proper orientation of the spring ends when the springs are deformed as a consequence of the application of a load thereto, it does not permit any sufficient movement of the fastening means which could develop a flexibility capable of modifying the flexibility characteristics of the seat under load. On the other hand, each spring is secured separately and independently of the others, so that the stresses cannot be distributed as a function of the point of application and surface area of the load.

In another known device pads or blocks of elastic material (rubber or synthetic material) are interposed between the spring ends and their points of anchorage to the frame, but this arrangement is attended by the same inconveniences as those mentioned hereinabove.

In a third known device a series of coil springs are distributed along the inner peripheral edge of the seat frame to which they are anchored at one end, the other ends of the springs being attached to an internal frame held in position only by the tractive force of the complete set of springs. Under these conditions the central portion of the seat squab has no inherent flexibility or elasticity in this device.

SUMMARY OF THE INVENTION

The device for flexibly fastening elastic suspension elements for seats, according to the present invention, is remarkable notably in that the ends of the intermediate of the loop springs are stapled to a flexible rod extending substantially at right angles to the springs, the ends of the flexible rod engaging freely in a supporting bearing rigidly secured to a peripheral frame, the ends of the outermost springs being advantageously secured to the frame in a conventional, rigid manner.

BRIEF DESCRIPTION OF THE DRAWINGS

Other features and advantages of the present invention will appear as the following description proceeds with reference to the attached drawings given by way of example and illustrating the manner in which the present invention may be carried out in practice. In the drawing:

FIG. 2b is a section taken along lines IIb—IIb of FIG. 2a;

DETAILED DESCRIPTION OF THE INVENTION

Figure 1:
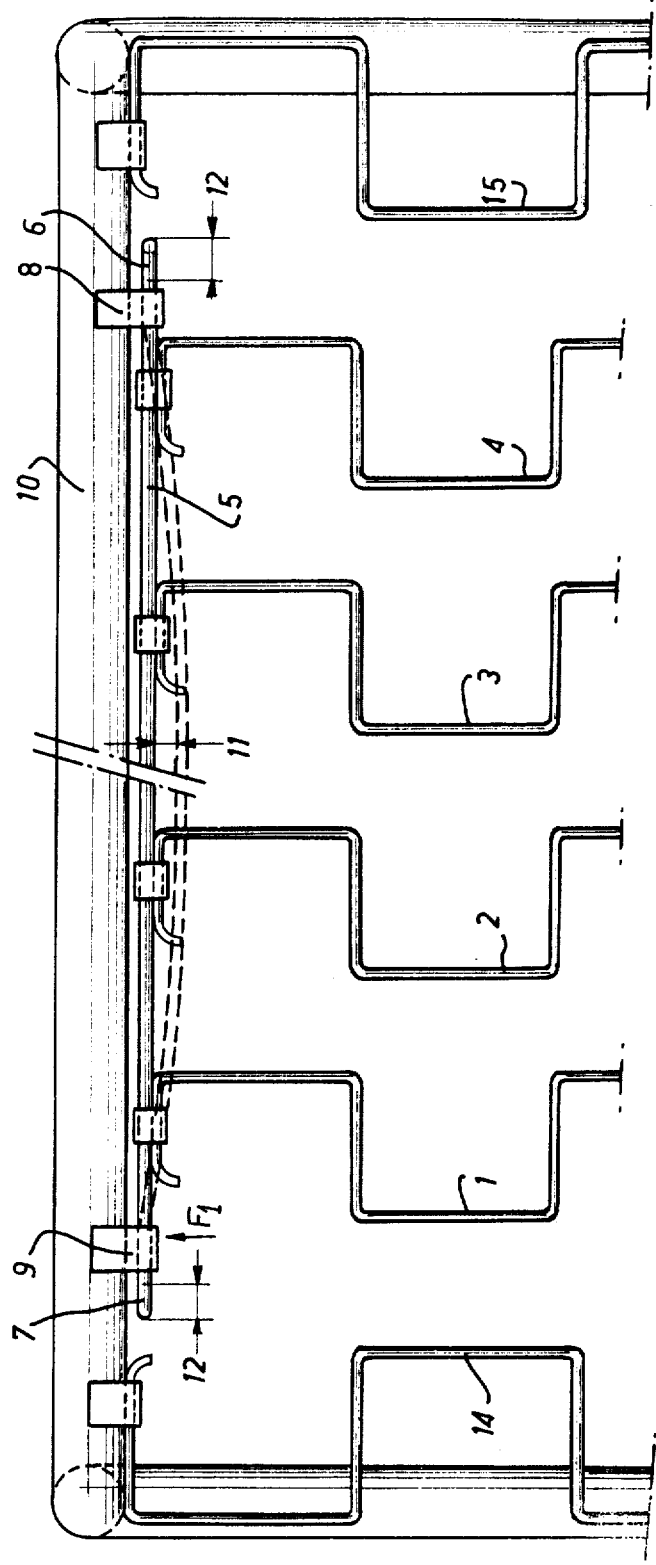
FIG. 1 is a diagrammatic and fragmentary plan view of the device of this invention.

Referring first to FIG. 1, the ends of each of intermediate of the loop springs, i.e., springs 1, 2, 3, 4..., are stapled to a flexible rod 5 extending substantially at right angles to these springs, the ends 6, 7 of this rod engaging freely in corresponding supporting bearings 8 and 9 respectively, which are rigidly secured to the relevant side of a frame 10. The outermost or end loop springs 14, 15 are rigidly secured to the same side of frame 10 by conventional means.

The above-described device operates as follows:

When a load is applied to the seat the consequent stressing of the intermediate loop springs 1 to 4 causes the flexible rod 5 to yield, thus producing a certain sag 11 so that the rod ends 6, 7 slide by an amount 12 in their bearings 8 and 9. Under these conditions, the rod 5 assumes the appearance of a catenary curve along which the load is distributed uniformly. The improved flexibility thus obtained is completed by the deflection of rod 5, thus eliminating the feeling of hardness usually felt by passengers utilizing seats according to the prior art, which comprise rigid means for attaching the spring ends.

Figure 2B:
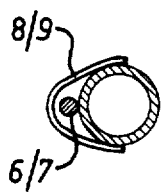
Figure 2A:
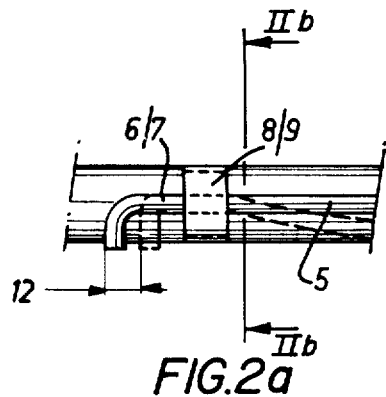
FIG. 2a is a view taken in the direction of the arrow $F_1$ showing a detail of the device of FIG. 1.

To avoid a possible disengagement of the rod ends 6, 7 from their bearings 8, 9 as a consequence of excessive loads or stress, these ends 6, 7 may be bent to a hook configuration as shown in FIG. 2a, these ends then acting as stroke limiting stops.

Figure 3:
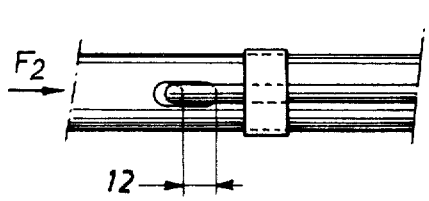
FIG. 3 is a modified detail of the assembly shown in FIG. 2.
Figure 4:
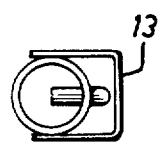
FIG. 4 is a view taken along the arrow $F_2$ of FIG. 3.

According to a modified embodiment of the invention, instead of sliding in a pair of end bearings forming inserts to the frame 10, the bent end portions 6, 7 of rod 5 may be releasably engaged in elongated holes formed in the frame 10 consisting in this example of tubular elements (FIG. 3), any undesired release of the rod being prevented by the use of stop collars 13 fitted to the frame 10 at suitable locations (see FIG. 4).

Of course, a suspension assembly attached to a frame structure according to the above-described examples may also be used on any of the members forming a seat, for example a back, or a squab as shown, the outermost spring elements 14, 15 being advantageously secured to the corresponding frame in a conventional rigid manner (for example by means of trunnion lugs) in order to obtain the stiffness necessary for holding the assembly, without impairing the flexibility and comfort in the loaded area.

Although a specific embodiment of this invention has been described hereinabove and illustrated in the accompanying drawing, it will readily occur to those skilled in the art that various modifications and changes may be brought thereto without departing from the scope of the invention as set forth in the appended claims.

What is claimed as new is:

1. In a seat, particularly of the type for use in motor vehicles, including a frame; a plurality of suspension elements comprising flexible loop springs extending parallel to each other across a dimension of said seat; and means for elastically suspending the ends of said loop springs to opposite sides of said frame; the improvement wherein said means for suspending comprises:
- a flexible rod extending substantially perpendicularly to the longitudinal dimension of said springs;
- means rigidly attaching the ends of at least the intermediate of said springs to said rod; and
- means for slidingly supporting the opposite ends of said rod on said frame and for allowing said rod, upon the application of a load to said springs, to flex and said opposite ends of said rod to slide substantially longitudinally of said frame.

2. The improvement claimed in claim 1, wherein each opposite end of said rod is bent, thus forming means for limiting the amount of longitudinal sliding movement of said rod.

3. The improvement claimed in claim 2, wherein said supporting means comprises a pair of bearing supports, one each slidingly supporting an opposite end of said rod; each of said bearing supports being fixed to said frame; said bent ends of said rod abutting said bearing supports.

4. The improvement claimed in claim 2, wherein said supporting means comprises a pair of elongated slots formed in said frame and extending longitudinally thereof; said bent ends of said rod extending into said slots; and stop collars fixed to said frame and extending around said rod to prevent said bent ends from being removed from said slots.

5. The improvement claimed in claim 1, wherein the outermost of said springs are rigidly fixed at the ends thereof to said frame.

* * * * *